Patented Sept. 6, 1938

2,128,987

UNITED STATES PATENT OFFICE 2,128,987

MOTOR FUEL

Leo M. Christensen, Atchison, Kans., assignor to The Chemical Foundation, Incorporated, a corporation of Delaware No Drawing. Application January 26, 1937, Serial No. 122,477

9 Claims. (Cl. 44—9)

This invention relates to improvements in motor fuels, more particularly to improved blends of denatured alcohol and hydrocarbon oils.

The present application is a continuation in part of my prior application Serial No. 85,181, filed June 13, 1936.

As is known, ethyl alcohol which is to be employed for the production of alcohol-gasoline blends under law must be denatured. The effective denaturation of ethyl alcohol, ultimately intended for this use, presents some special problems. To serve effectively, the denaturant employed should be miscible in gasoline as well as in the ethyl alcohol. It should have a boiling point, or boiling range, quite close to that of ethyl alcohol. Preferably it should be of such a character that even when employed in small amounts in the alcohol it shall render such alcohol decidedly distasteful and preferably nauseating. Finally, it should be of sufficiently high volatility and of such a characteristic and disagreeable odor that its presence in the alcohol, even in minor amounts, is unmistakably apparent.

As explained in the copending application referred to, these criteria are largely satisfied by employing relatively low boiling point isonitriles. These isonitriles, or isocyanides, are substantially colorless liquids which are readily soluble in alcohol and are soluble in minor proportions in hydrocarbons. Finally, the isonitriles are quite stable and are not readily hydrolyzable.

As pointed out in the prior application referred to, such compounds, particularly the lower boiling point isonitriles, such as isopropyl isonitrile (B. P. 87° C.), serve effectively for denaturing ethyl alcohol. This boiling point, 87° C., is quite close to that of ethyl alcohol. However, the differential in boiling points is sufficient to permit fractionation.

According to the present invention, the denaturation of ethyl alcohol for employment in the arts and particularly as a motor fuel blend is rendered much more effective by utilizing special mixtures of isonitriles as the denaturant. The concept of the invention comprehends the utilization of isonitrile mixtures, certain components of which have boiling points above but close to that of ethyl alcohol, and certain other components of which have boiling points close to but below that of ethyl alcohol. By employing a mixture of this character, separation of the pure alcohol from the denatured alcohol is rendered extremely difficult. This difficulty of separation is accentuated by the fact that the mixtures herein contemplated are highly effective in very small and almost minute quantities. With this high potency, therefore, the separation of alcohol from the denaturant, to be effective, would have to be almost absolutely quantitative. Such a quantitative separation is rendered practically impossible by utilizing the principle of the present invention, namely by utilizing a denaturant mixture within the boiling range of which is comprehended the boiling point of ethyl alcohol.

The compositions provided by the present invention also insure other advantages. As has been pointed out, a major function of the denaturant is to indicate with surety the fact that the alcohol is denatured. When employing substances of the class defined herein which are of a disagreeable odor, it is clear that the lower boiling point of relatively readily volatile compounds are most effective for indicating that the alcohol is denatured. However, as the boiling point of the denaturant is lowered and the differential between this boiling point and that of ethyl alcohol is proportionately increased, clean cut fractionation of the ethyl alcohol is facilitated. Under the principles of the present invention, however, the advantages accruing from the use of a relatively volatile isonitrile are achieved, while at the same time the major advantage of difficult separation or fractionation is retained by employing in conjunction with the more volatile isonitrile a less volatile isonitrile and preferably one having a boiling point above that of ethyl alcohol.

Another advantage of the present invention is that the formula of the denatured alcohol may readily, and if desired, periodically be changed by substituting certain isonitriles in the formula for certain others. In this manner the determination or establishment of the formula by unauthorized persons for unlawful purposes can be made extremely difficult.

In producing the ultimate fuel the denaturant mixture may be added to the alcohol either before or after the latter is blended with the gasoline or other hydrocarbon fuel. Again, the denaturant mixture may be admixed with the alcohol either before or after the addition of the blending agent, whenever one is needed. Finally, the denaturant composition may be mixed with the blending agent and then added to the alcohol to be denatured.

Within the concept of the invention, as will be appreciated, a relatively wide range of denaturant mixtures may be employed. Thus, typical compositions produced according to the present invention will comprise the following:

| | Parts |
|---|---|
| Methyl isonitrile, (B. P. 59.6° C.) | 10 |
| Ethyl isonitrile, (B. P. 79° C.) | 40 |
| Propyl isonitrile, (B. P. 99.5° C.) | 40 |
| Isopropyl isonitrile, (B. P. 87° C.) | |
| Butyl isonitrile, (B. P. 119° C.) | |
| Isobutyl isonitrile, (B. P. 114° C.) | 10 |
| Amyl isonitrile, (B. P. 137° C.) | |
| Isoamyl isonitrile, (B. P. 137° C.) | |

In this formula, as will be understood, a relatively large percentage of the total mixture has a boiling point or boiling range very close to that of ethyl alcohol. Thus, this mixture contains 40 parts of ethyl isonitrile and 40 parts of a mixture of propyl and isopropyl isonitrile; in other words, 80 parts of a mixture, the mean boiling point of which very closely approximates that of ethyl alcohol. The mixture includes a minor, though appreciable, percentage of a compound (methyl isonitrile) boiling below ethyl alcohol and a similar proportion of compounds (butyl, isobutyl, amyl and isoamyl isonitrile) boiling above ethyl alcohol.

In the formula described the higher boiling isonitriles, i. e., butyl, isobutyl, amyl and isoamyl isonitrile, comprise 10% of the isonitrile mixture. This percentage may be considerably varied; that is to say, a formula may be made up which contains from 2 or more percent to 30 or more percent of the higher boiling point isonitriles. It will be understood also that the respective percentages of each of these higher boiling isonitriles may be considerably varied. Thus a formula may be made up in which only one of these higher boiling isonitriles (butyl or above) is employed. Preferably, however, as indicated in the formula, mixtures of higher boiling point isonitriles are employed.

Similarly, the percentage of the methyl isonitrile in the denaturant mixture may be increased or decreased within relatively wide ranges.

The essential characteristic of each of the formulae comprehended under the present invention is the inclusion in an isonitrile mixture of isonitrile compounds, certain of which have a boiling point approximating that of ethyl alcohol, together with other isonitriles of boiling points respectively above and below that of ethyl alcohol.

The separation of all of these denaturing compounds from a homogeneous admixture with alcohol, as will be appreciated, is an extremely difficult task, requiring the most critical control of fractionation conditions, rerunning of distillates and the like, with an attendant and substantially prohibitive expense. The recovery of pure ethyl alcohol from such a denatured alcohol in a blend with gasoline would be correspondingly more expensive.

The compounds described herein, i. e., the alkyl isonitriles, may be made up in the manner known to those skilled in the art, that is to say by utilizing the carbylamine reaction. Preferably these compounds are produced by reacting the corresponding primary amines with chloroform and caustic in the presence of alcohol.

In employing the special mixture herein described, for the purpose of denaturing alcohol, it is found that an effective range comprises approximately .05% to .001% by volume of the isonitrile mixture in the ultimate gasoline-alcohol blend. For a typical blend, containing from 10 to 20% of ethyl alcohol in gasoline, a usual and highly effective denaturant comprises approximately .0005% by volume of an isonitrile mixture, such as that described, in the ultimate fuel. It is to be understood that this range is not critical and larger amounts can be employed. Such larger amounts, however, serve no useful purpose because of the great effectiveness of the indicated small amounts of the mixture.

The invention, therefore, is not to be considered limited to the particular formula given or to those indicated; on the contrary, the invention is conceived to reside in the concept of utilizing a mixture of isonitriles of such a character that denaturing compounds having a boiling point respectively above and below that of the alcohol to be denatured are present. Thus, while typical examples of the invention have been given, it is to be understood that these are exemplary in character to illustrate the underlying principles of the invention.

I claim:

1. That method of denaturing power alcohol which comprises dissolving in the alcohol a number of alkyl isonitriles, in a quantity sufficient only to render the alcohol unpotable, certain of which isonitriles boil above and certain of which boil below ethyl alcohol.

2. Denatured power alcohol comprising ethyl alcohol in which is dissolved a mixture of alkyl isonitriles, in a quantity sufficient to render the alcohol unpotable, certain of which have a boiling point above and certain of which have a boiling point below that of ethyl alcohol.

3. Denatured power alcohol comprising ethyl alcohol and a sufficient quantity of a mixture of alkyl isonitriles to render the alcohol unpotable, such mixture having a boiling range from 59.6° C. to 137° C.

4. Denatured power alcohol comprising ethyl alcohol and a sufficient amount of a mixture of alkyl isonitriles to render the alcohol unpotable, such mixture having a boiling range from 59.6° C. to 119° C.

5. Denatured power alcohol comprising ethyl alcohol and a sufficient amount of a mixture of alkyl isonitriles to render the alcohol unpotable, such mixture having a boiling range from 59.5° C. to 119° C.

6. Denatured power alcohol comprising ethyl alcohol and a sufficient amount of a mixture of alkyl isonitriles to render the alcohol unpotable, such mixture having a boiling range from 59.6° C. to 99.5° C.

7. Denatured power alcohol comprising ethyl alcohol and a mixture of alkyl isonitriles, said mixture comprising an alkyl isonitrile having a boiling point closely approximating that of ethyl alcohol, and other alkyl isonitriles having boiling points respectively above and below that of ethyl alcohol.

8. A composition of matter comprising a light hydrocarbon oil fraction having the characteristics of gasoline which is intimately blended with a lower aliphatic alcohol, which alcohol contains a sufficient percentage of a mixture of alkyl isonitriles to render the alcohol unpotable, certain components of the mixture having boiling points respectively above and below that of the alcohol.

9. A denaturant concentrate adapted for blending with commercial gasoline which comprises a minor percentage of gasoline and a major percentage of ethyl alcohol, and also containing a number of alkyl isonitriles in a quantity sufficient to render the alcohol unpotable, at least one of which is less volatile, and at least one other of which is more volatile, than ethyl alcohol.

LEO M. CHRISTENSEN.